April 13, 1965        S. H. DEWS        3,177,965
LINK TYPE INDEPENDENT WHEEL SUSPENSION FOR VEHICLES
Filed April 11, 1961        4 Sheets-Sheet 1

STANLEY H. DEWS
INVENTOR.

BY John R. Faulkner
Clifford L. Sadler

ATTORNEYS

April 13, 1965 S. H. DEWS 3,177,965
LINK TYPE INDEPENDENT WHEEL SUSPENSION FOR VEHICLES
Filed April 11, 1961 4 Sheets-Sheet 2

STANLEY H. DEWS
INVENTOR
BY
ATTORNEYS

April 13, 1965 S. H. DEWS 3,177,965
LINK TYPE INDEPENDENT WHEEL SUSPENSION FOR VEHICLES
Filed April 11, 1961 4 Sheets-Sheet 3

STANLEY H. DEWS
INVENTOR.

BY John R. Paulkner
Clifford L. Sadler
ATTORNEYS

United States Patent Office 3,177,965
Patented Apr. 13, 1965

3,177,965
LINK TYPE INDEPENDENT WHEEL
SUSPENSION FOR VEHICLES
Stanley H. Dews, Rubery, Worcester, England, assignor to Ford Motor Company, Dearborn, Mich., a corporation of Delaware
Filed Apr. 11, 1961, Ser. No. 102,167
Claims priority, application Great Britain, Apr. 12, 1960, 12,980/60
1 Claim. (Cl. 180—73)

This invention relates generally to independent wheel suspension systems for motor vehicles and more particularly to suspension systems of the so-called trailing arm or link type.

Broadly speaking, a vehicle suspension system constructed in accordance with the teachings of this invention provides an independent wheel support comprising a swing axle member, a generally vertically acting cushioning device, and a generally longitudinally extending link member.

According to the invention the trailing link member is pivotally secured at its forward end to the sprung mass of the vehicle by a Cardan universal joint or similar coupling. The link is free to pivot about this coupling but is unable to rotate about its own longitudinal axis.

A suspension of this type reduces the inherent disadvantages of trailing link and swing axle suspensions as heretofore known. For example, this invention provides a lightweight simple design that is easy to manufacture. It is adaptable to any desirable suspension geometry such as those having anti-lift and anti-squat characteristics. It is equally applicable to suspensions for driven or non-driven and steerable or non-steerable wheels. Further, it may easily be adapted to provide a suitable suspension for a wide variety of vehicle types.

A better understanding of this invention and its advantages will be obtained from the following detailed description and the accompanying drawings in which.

Figure 1:
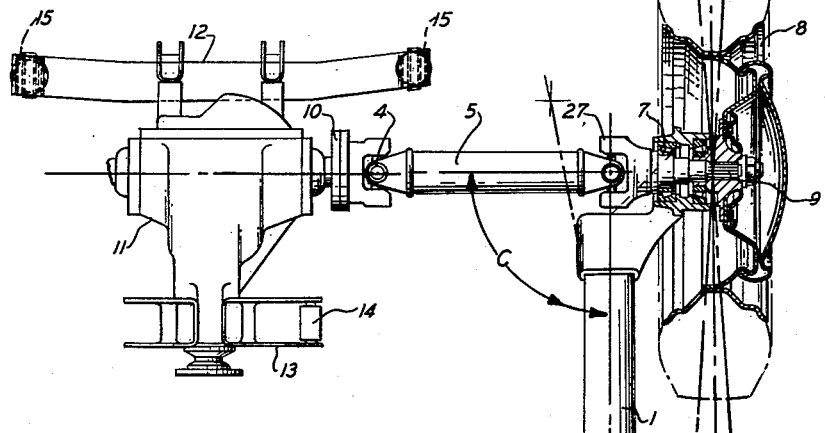
FIGURE 1 is a plan view of a suspension constructed according to the present invention as applied to a driven, non-steerable wheel.
Figure 5:
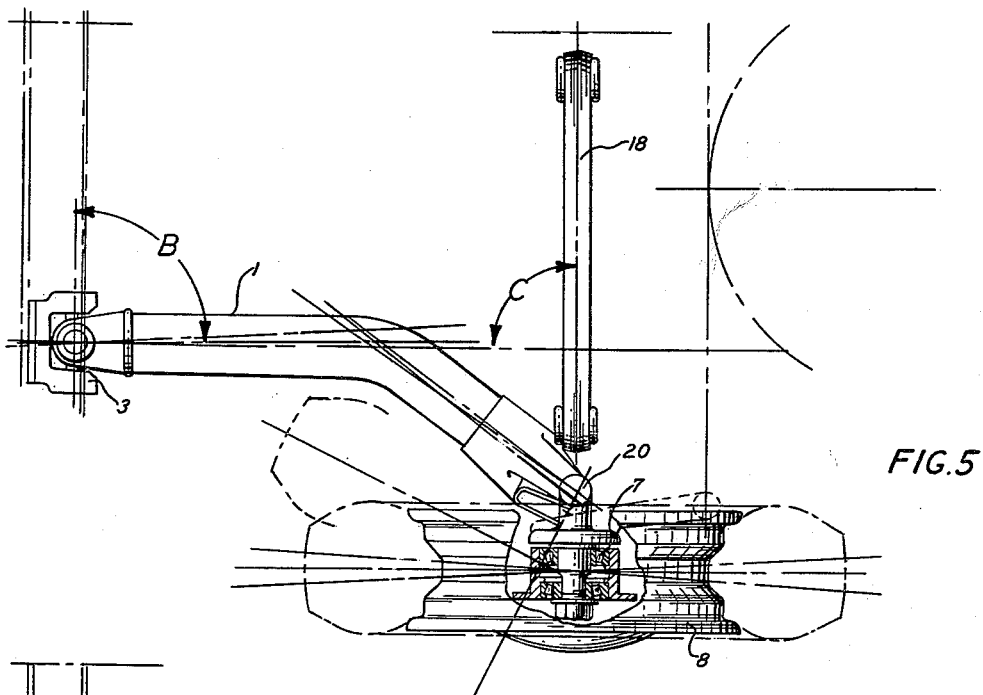
Figure 6:
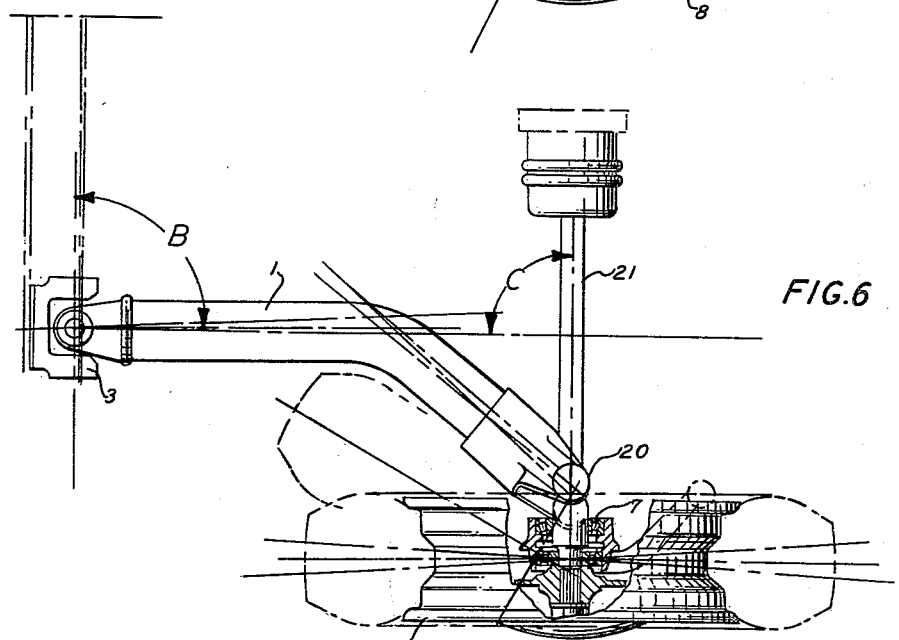

FIGURE 5 discloses another another modification corresponding to FIGURE 1 for a steerable non-driven wheel; and FIGURE 6 is still another modification corresponding to FIGURE 1 for a steerable driven wheel.

Figure 2:
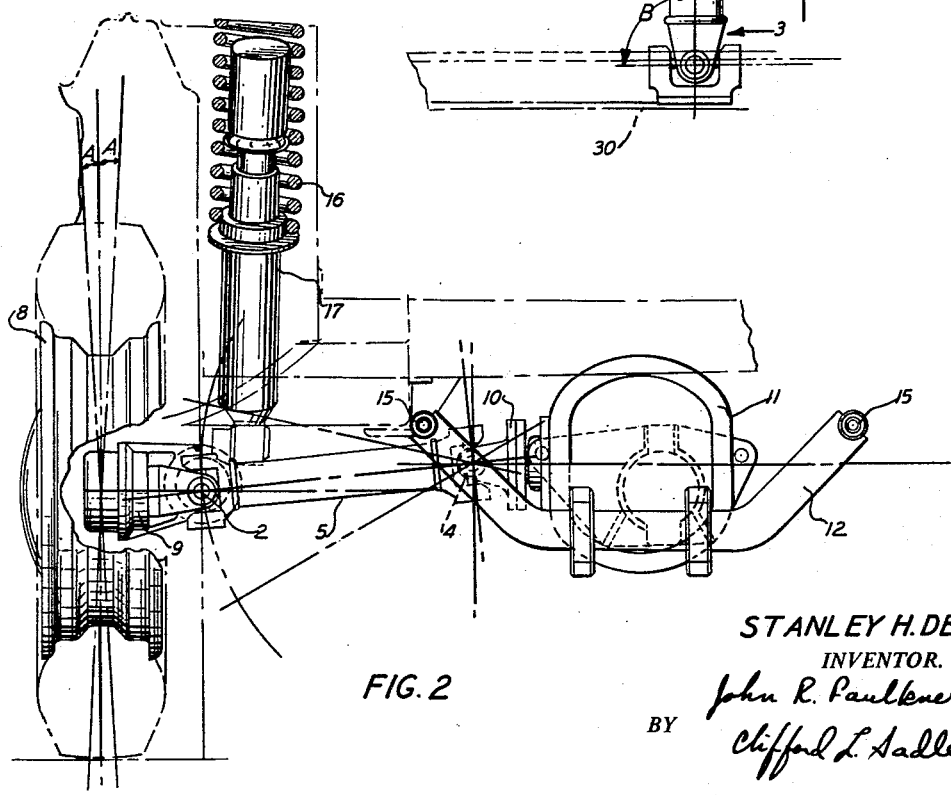
FIGURE 2 is a rear elevation of the structure of FIGURE 1.
Figure 3:
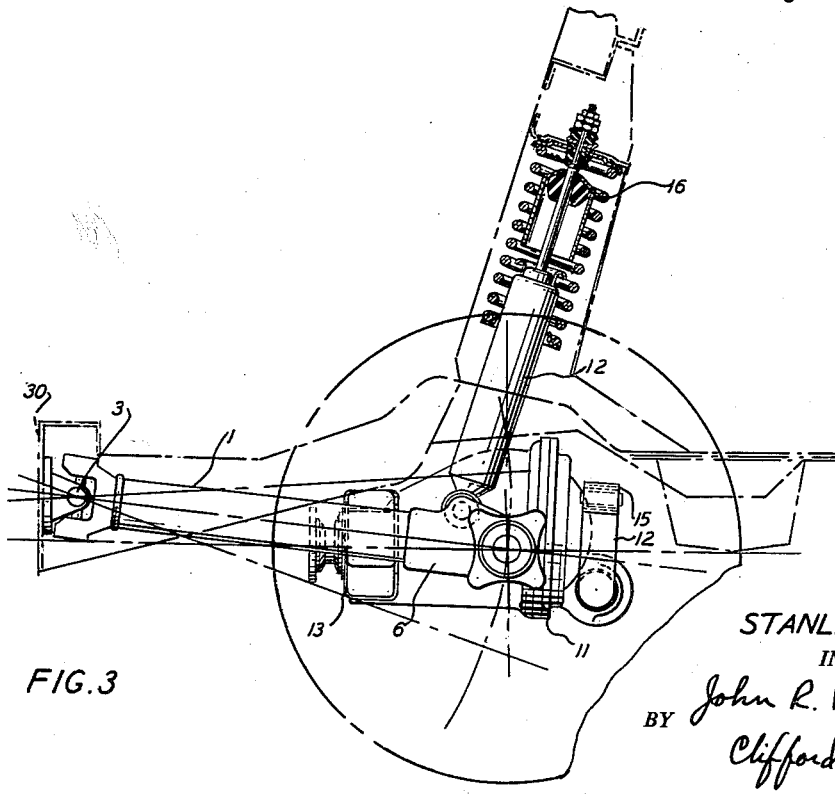
FIGURE 3 is a side elevation of the structure of FIGURE 2.

Referring now to the drawings, wherein like reference numerals identify like parts throughout the various views, in FIGURES 1, 2, and 3 there is shown a trailing link suspension system for the independent support of driven non-steerable wheels such as the rear wheels of an automobile vehicle.

This suspension system includes a trailing link member 1 that is attached rigidly at one of its ends to a bearing housing 6 for a road wheel 8 and to a vehicle chassis frame 30 by a Cardan type joint or coupling 3 at its forward end. Link 1 is free to pivot about the center of the coupling 3 but it cannot rotate about its own longitudinal axis. This arrangement permits the link 1 to absorb fore and aft loadings such as acceleration and deceleration forces and also, those forces tending to rotate the wheel about the axis of the link such as occur during cornering. The link member 1 can be a tube, forging, or pressing of suitable strength to absorb the vehicle weight reactions, cornering loads, brake and acceleration reactions, and provide the desired stability to the system.

A transversely disposed final drive or half shaft 5 is attached by a Cardan universal joint 2 to a final drive axle or stub shaft 9 that is journaled in the housing 6 by a span of bearings 7. The inboard end of the shaft 5 is connected by a Cardan universal joint 4 to output shaft 10 of differential unit 11. The half shaft 5 forms a fixed length element of the suspension system. In addition to carrying the drive torque, the shaft 5 gives lateral stability to the suspension system and controls such forces as those created during cornering.

The differential unit 11 is secured to the vehicle body or frame by support members 12 and 13 that are secured to rubber mountings 14 and 15. The rubber mountings 14 and 15 act as vibration insulators and are designed to carry cornering or side loads of the suspension as well as torque reaction due to driving forces.

At the outboard end of the half shaft 5, the wheel 8 is secured by means of a splined connection to the outer end of the stub axle 9. The bearings 7 are sealed against dirt, water and loss of lubricant in the usual manner.

A coil suspension spring 16 extends generally upwardly from the bearing housing 6 to which it is attached. Its upper end is suitably secured to a sprung body or chassis member in the region of the wheel housing. Sufficient strength must be provided in the mounting for the spring 16 to carry the forces of the suspension load. The spring 16 is disposed about a telescopic shock absorber unit 17 in concentric fashion.

The cushioning unit shown in the drawing is of conventional coil spring and hydraulic plunger construction, however, a suitable pneumatic-hydraulic device may be substituted. Jounce and rebound limiting stops can be incorporated within these units and the complete linkage results in a simple and economical independent suspension system.

The present invention provides a means for controlling and adjusting the wheel camber, caster and toe-in by appropriate positioning of the forward trailing link coupling 3. The change necessary in wheel camber angle A (see FIGURE 2) to maintain the wheel 8 generally square with the ground during normal conditions of vehicle roll can be readily obtained by selecting the angle of the mounting face of the Cardan coupling 3 relative to the trailing link member 1 so as to position the coupling towards the center of the vehicle and towards the differential unit coupling 4.

Figure 1A:
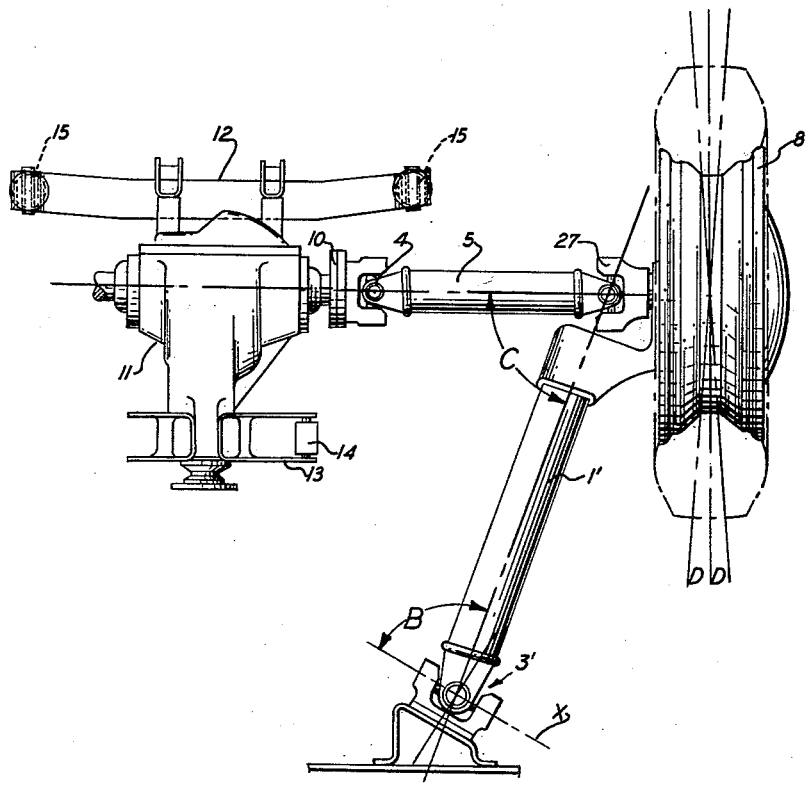
FIGURE 1a is a plan view of a modification of the structure of FIGURE 1.

The angle B as seen in FIGURE 1 can be selected relative to the trailing link 1 and the body of the vehicle. Also, the trailing link member angle C can be pivoted around the outer half shaft coupling 2 (in the plan view) to be parallel with the center line of the vehicle. The coupling 3 may be mounted towards the center of the vehicle to make an angle C of more or less than 90 degress. In the modified construction of FIGURE 1a, the universal joint 3' is moved inwardly and the horizontal axis x about which link 1' pivots is inclined rearwardly and inwardly. With such a construction the change in camber angle under roll conditions will be reduced. With the FIGURE 1 construction, a roll of five degrees will cause a five-degree change in the wheel to ground camber angle (angle A) whereas in FIGURE 1a with the axis x inclined there will be a camber change of less than five degrees.

As the half shaft 5 moves with wheel deflection, a steer angle D (see FIGURE 1) is imparted to the wheel due to the trailing member 1 pivoting about the coupling 3.

Angle D is the amount of toe-out at the front of the wheel and is varied in magnitude as the camber angle A is varied by positioning the coupling 3. The steer angle D reduces with increased camber change setting.

The differential unit 11 may be so positioned relative to the outer universal joint 2 as to select optimum geometry and reduce the angle on rebound of the inner joint 4.

The Cardan joint 3 can be so positioned (as seen in FIGURE 3) as to provide the geometry necessary to give an anti-squat force against acceleration and an anti-lift force against braking. The joint 3 may be moved and inclined as in FIGURE 1a, in order to obtain desired camber characteristics. Similarly, the suspension may be constructed with the joint 3 located to give anti-squat and anti-lift features. For example, the percentage of anti-squat and anti-lift may be increased by positioning the joint 3 (in FIGURE 3) at a greater vertical distance above the wheel center and the ground contact point of the wheel respectively.

Figure 4:
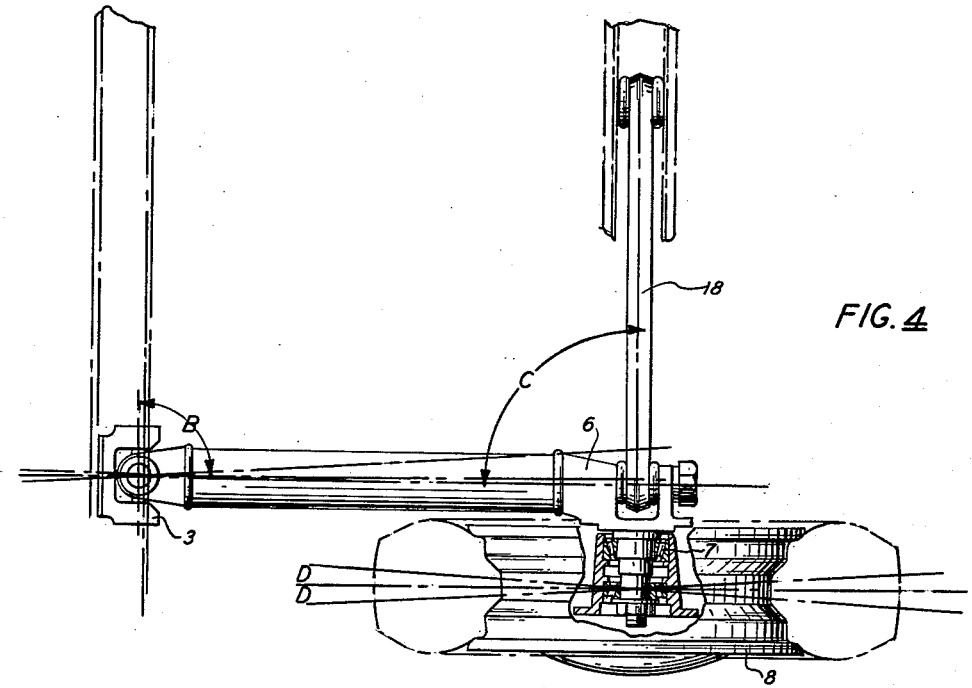
FIGURE 4 shows a modification of this invention corresponding to FIGURE 1 for a non-steerable, non-driven wheel.

A modification of the present invention for non-steerable non-driven wheels is shown in FIGURE 4. That figure is a plan view similar to FIGURE 1 and shows a rear suspension arrangement suitable for front wheel drive vehicles. The half shaft 5 and the inner and outer universal joints 2, 3 of the embodiment shown in FIGURE 1 are replaced by a transverse link 18. The link 18 is simply pivoted to the member 6 and the sprung mass.

FIGURE 5 shows an adaptation for a steerable non-driven wheel such as the front wheel of a rear wheel driven vehicle. The trailing link member 1 is crank-shaped and is provided with a pivotal coupling 20 for connection to the wheel support member. This construction accommodates the steering motion of the wheel as indicated by the dotted line 19. The steering arm is indicated at 22.

FIGURE 6 shows a generally similar construction for a front wheel drive axle 21 in combination with the steerable arrangement of FIGURE 5.

Modifications may occur to those skilled in the art which will come within the scope of the invention. It will be understood that the invention is applicable to both trailing and leading link constructions for front and rear wheels.

As used in the following claim, the term "universal joint" refers to any coupling device in which pivotal movement is permissible about two perpendicular coordinate axes, but relative rotary motion about the third perpendicular coordinate is not permitted. By way of illustration, Cardan joints and the like function in such a fashion.

I claim:

A motor vehicle suspension system comprising a frame, a wheel and wheel positioning means interconnecting said frame and said wheel, said means permitting jounce and rebound movement of said wheel with respect to said frame, spring means resiliently supporting said frame on said wheel, said wheel positioning means including a bearing housing rotatably supporting said wheel, a suspension link extending generally longitudinally of said frame and having one end rigidly secured to said housing, a joint connecting the other end of said link with said frame, said joint being constructed for pivotal movement of said link about vertical and horizontal axes with respect to said frame, said joint being torsionally rigid about the axis of said link to maintain said wheel in a fixed vertical relationship with respect to said frame, a differential gear unit secured to said frame, a laterally extending drive shaft means of finite length, said drive shaft means including an inner universal joint connecting the inner end of said shaft with said differential and an outer universal drive joint connecting the outer end of said shaft with said wheel, said drive shaft means being constructed to maintain the effective center of said outer universal joint a fixed distance from the effective center of said inner universal joint.

References Cited by the Examiner
UNITED STATES PATENTS

| | | | |
|---|---|---|---|
| 1,794,145 | 2/31 | Bussien | 180—43 |
| 2,077,969 | 4/37 | Tibbetts | 267—11 |
| 2,112,133 | 3/38 | Best | 280—124 X |
| 2,153,271 | 4/39 | Paton | 280—124 X |
| 2,219,828 | 10/40 | Steinman | 280—124 X |
| 2,475,487 | 7/49 | Ennis | 180—73 |
| 2,739,658 | 3/56 | Kolbe | 280—112 X |
| 2,806,713 | 9/57 | Muller | 267—66 X |
| 3,002,580 | 10/61 | Mueller | 180—73 |

A. HARRY LEVY, *Primary Examiner.*

PHILIP ARNOLD, LEO FRIAGLIA, *Examiners.*